United States Patent
Mizobata et al.

(10) Patent No.: US 10,384,377 B2
(45) Date of Patent: Aug. 20, 2019

(54) HEADREST AND METHOD OF MANUFACTURING THE HEADREST

(71) Applicant: TOYOTA BOSHOKU KABUSHIKI KAISHA, Aichi-ken (JP)

(72) Inventors: Hiroshi Mizobata, Aichi-ken (JP); Shuuhei Miyake, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 524 days.

(21) Appl. No.: 15/086,784

(22) Filed: Mar. 31, 2016

(65) Prior Publication Data
US 2016/0311351 A1 Oct. 27, 2016

(30) Foreign Application Priority Data
Apr. 21, 2015 (JP) ................ 2015-086353

(51) Int. Cl.
| | |
|---|---|
| *B29C 44/12* | (2006.01) |
| *B29C 44/14* | (2006.01) |
| *B60N 2/80* | (2018.01) |
| B29K 75/00 | (2006.01) |
| B29L 31/30 | (2006.01) |

(52) U.S. Cl.
CPC ...... *B29C 44/1257* (2013.01); *B29C 44/1252* (2013.01); *B29C 44/14* (2013.01); *B60N 2/80* (2018.02); *B29K 2075/00* (2013.01); *B29L 2031/3023* (2013.01); *B60N 2002/899* (2018.02)

(58) Field of Classification Search
CPC ........ B60N 2/80; B60N 2/50; B29C 44/1257; B29C 44/1252; B29C 44/14
See application file for complete search history.

(56) References Cited

U.S. PATENT DOCUMENTS

| | | | |
|---|---|---|---|
| 2015/0159721 A1* | 6/2015 | Okubo | B60N 2/80 297/404 |
| 2016/0121770 A1* | 5/2016 | Takahashi | B60N 2/80 297/452.18 |

FOREIGN PATENT DOCUMENTS

| | | |
|---|---|---|
| JP | 47-014513 | 5/1972 |
| JP | 59-120634 | 8/1984 |
| JP | 60-151135 | 8/1985 |
| JP | 10-226255 | 8/1998 |
| JP | 2012-86715 | 5/2012 |
| JP | 2013-209027 | 10/2013 |

OTHER PUBLICATIONS

Japanese Office Action for JP 2015-086353 dated Sep. 11, 2018, along with partial English translation.

* cited by examiner

*Primary Examiner* — Anthony D Barfield
(74) *Attorney, Agent, or Firm* — Greenblum & Bernstein, P.L.C.

(57) ABSTRACT

A headrest includes a stay, a skin material, a cushion material and a dynamic damper. The cushion material is foam-molded integrally with the stay inside the skin material, and has a hollow portion therein. The dynamic damper is attached to the stay, and is disposed in the hollow portion in such a manner as not to abut on the cushion material.

3 Claims, 8 Drawing Sheets

HEADREST AND METHOD OF MANUFACTURING THE HEADREST

INCORPORATION BY REFERENCE

The disclosure of Japanese Patent Application No. 2015-086353 filed on Apr. 21, 2015 including the specification, drawings and abstract is incorporated herein by reference in its entirety.

BACKGROUND OF THE INVENTION

1. Field of the Invention

The invention relates to a headrest that is fitted to a vehicle seat, and a method of manufacturing the headrest.

2. Description of Related Art

There is known a headrest for a vehicle seat in which vibrations transmitted from a vehicle body to the vehicle seat are transmitted to a dynamic damper provided in the headrest to cause resonance, and the vibrations of the vehicle seat are thus converted into vibrations of the dynamic damper so that the vibrations of the vehicle seat are suppressed. In a headrest described in Japanese Patent Application Publication No. 60-151135 (JP 60-151135 A), an inner cover is attached to a frame of the headrest, and a dynamic damper is disposed in a space portion in the inner cover. Thus, the dynamic damper freely vibrates without being hindered from moving by a cushion material of the head rest. Thus, vibrations of a seat back can be efficiently suppressed.

SUMMARY OF THE INVENTION

In an art described in Japanese Patent Application Publication No. 60-151135 (JP 60-151135 A), the inner cover is employed to form the space portion, in which the dynamic damper is disposed, in the cushion material of the headrest. Therefore, an increase in weight may be incurred due to an increase in the number of parts.

The invention provides a headrest that is equipped with a dynamic damper that is disposed in a space portion formed in a cushion material of the headrest without employing a part such as an inner cover or the like, and a method of manufacturing the headrest.

A headrest according to a first aspect of the invention includes a stay, a skin material, a cushion material and a dynamic damper. The cushion material is foam-molded integrally with the stay inside the skin material, and has a hollow portion therein. The dynamic damper is attached to the stay, and is disposed in the hollow portion in such a manner as not to abut on the cushion material.

According to the aforementioned aspect of the invention, the dynamic damper is disposed in the hollow portion formed in the cushion material, and does not abut on the cushion material when vibrating. Thus, the dynamic damper can sufficiently vibrate, and can efficiently suppress vibrations of a seat back. Besides, the hollow portion in the cushion material is formed when the cushion material is molded. Therefore, there is no need to employ a part such as an inner cover or the like, and an increase in weight resulting from an increase in the number of parts can be suppressed.

In the aforementioned aspect of the invention, the dynamic damper may include a weight, and an elastic body that is integrally attached to the weight. The elastic body may be directly attached to the stay.

According to the aforementioned configuration, vibrations of the weight are likely to be transmitted to the stay of the headrest, so vibrations of the seat back can be more efficiently suppressed. Besides, the hollow portion in the cushion material is formed when the cushion material is molded. Therefore, there is no need to employ a part such as an inner cover or the like, and an increase in weight resulting from an increase in the number of parts can be suppressed.

A method of manufacturing the headrest according to a second aspect of the invention includes arranging the skin material in a molding die, arranging the stay, to which an air bag is attached in such a manner as to cover the dynamic damper, inside the skin material, injecting a foamable synthetic resin raw material into the skin material to foam-mold the injected foamable synthetic resin raw material integrally with the stay, and taking out the air bag from the headrest after foam formation and solidification of the foamable synthetic resin raw material, or perforating a hole in the air bag and removing air therefrom after foam formation and solidification of the foamable synthetic resin raw material.

According to the aforementioned configuration, the hollow portion for disposing the dynamic damper can be formed in the cushion material, and there is no need to employ a part such as an inner cover or the like. Thus, the head rest that is designed to suppress an increase in weight resulting from an increase in the number of parts can be manufactured.

A method of manufacturing the headrest according to a third aspect of the invention includes arranging the skin material in a molding die, arranging the stay, to which the air bag is attached in such a manner as to cover the dynamic damper, inside the skin material, and injecting a foamable synthetic resin raw material into the skin material to foam-mold the injected foamable synthetic resin raw material integrally with the stay, such that the air bag breaks and air is removed therefrom in a course of foam formation and solidification by heat generated at a time of foam formation and solidification of the foamable synthetic resin raw material.

According to the aforementioned aspect of the invention, there is no need to take out the air bag to form the hollow portion for disposing the dynamic damper in the cushion material. Therefore, the process of manufacturing can be simplified. Besides, the air bag is lighter and cheaper than a part such as an inner cover or the like. Therefore, the head rest that is designed to suppress an increase in weight resulting from an increase in the number of parts can be manufactured.

A method of manufacturing the headrest according to a fourth aspect of the invention includes arranging the skin material in a molding die, arranging the stay, which is obtained by forming a low-melting-point material with a melting point lower than a foam formation-solidification reaction temperature of a foamable synthetic resin raw material in an outer shape corresponding to an inner shape of the hollow portion, inside the skin material in such a manner as to cover the dynamic damper, and injecting the foamable synthetic resin raw material into the skin material to foam-mold the injected foamable synthetic resin raw material integrally with the stay, such that the low-melting-point material is fused by heat generated at a time of foam formation and solidification of the foamable synthetic resin raw material.

According to the aforementioned aspect of the invention, the hollow portion for disposing the dynamic damper can be formed in the cushion material, and there is no need to employ a part such as an inner cover or the like. Thus, the head rest that is designed to suppress an increase in weight resulting from an increase in the number of parts can be manufactured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
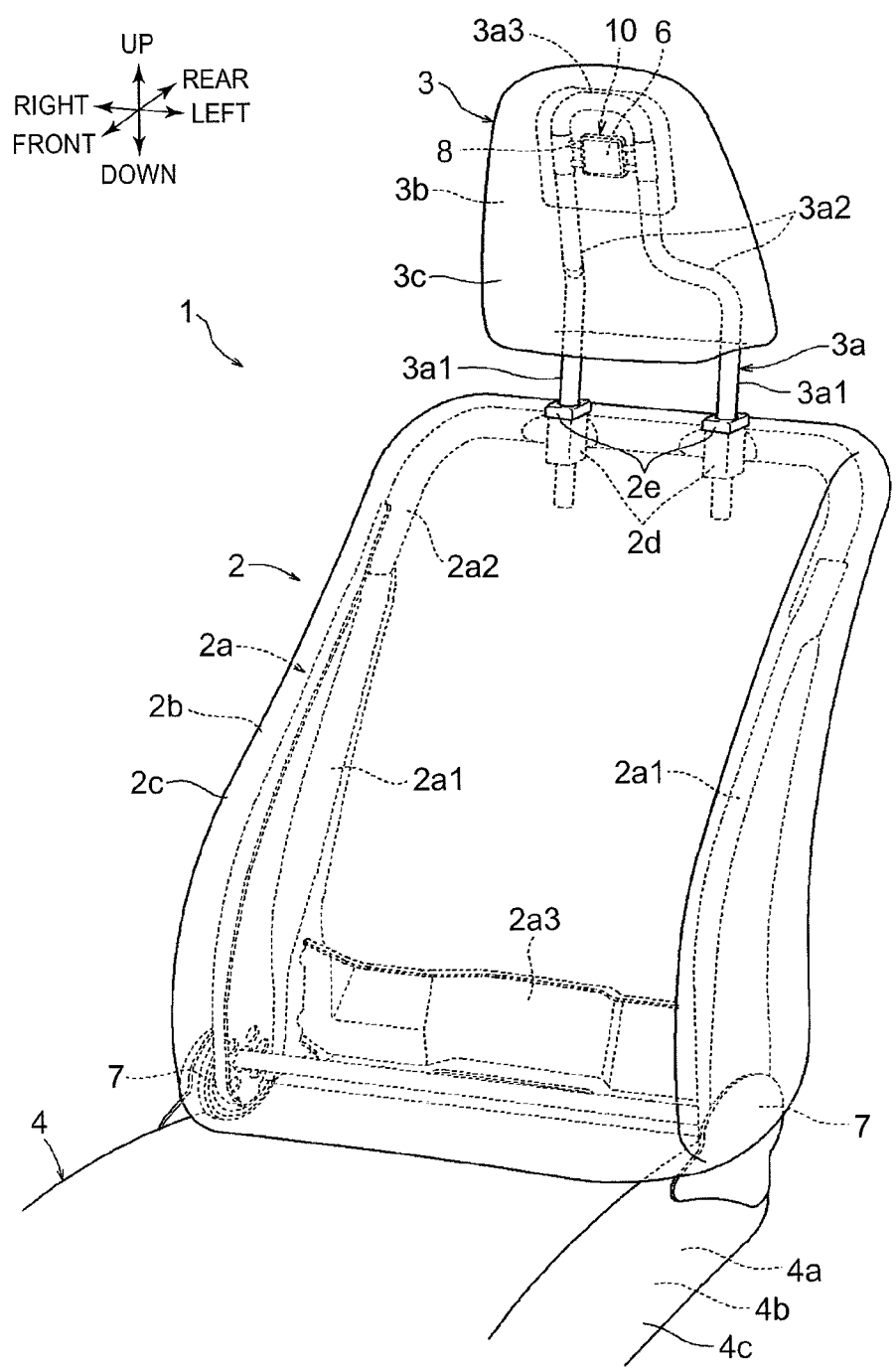
FIG. 1 is a partial perspective view of a vehicle seat to which a headrest according to one embodiment of the invention is attached.

FIGS. 1 to 7 show one embodiment of the invention. This embodiment of the invention is an example in which the invention is applied to an automobile seat. In each of the drawings, respective directions of an automobile are denoted by arrows when the automobile seat is attached to the automobile. In the following description, the description of directions will be given with reference to those directions. An automobile seat 1 is equipped with a seat cushion 4 that serves as a seating portion, a seat back 2 that serves as a backrest, and a headrest 3 that supports a head. Lower end portions of the seat back 2 on both sides thereof are coupled, in an angularly adjustable manner, to rear end portions of the seat cushion 4 via recliners 7 respectively. The headrest 3 is the headrest according to the present embodiment of the invention.

As shown in FIG. 1, the seat back 2, the headrest 3 and the seat cushion 4 have frames 2a, 3a and 4a as skeletons, pads 2b, 3b and 4b as cushion materials, and skins 2c, 3c and 4c as skin materials, respectively. The pads 2b, 3b and 4b are laid on the frames 2a, 3a and 4a respectively. The pads 2b, 3b and 4b are covered with the skins 2c, 3c and 4c respectively. The frame 2a of the seat back 2 has a pair of right and left side frames 2a1, a pipe-like upper frame 2a2 that couples upper portions of the side frame 2a1 to each other, and a pressing plate-like lower panel 2a3 that couples lower portions of the side frame 2a1 to each other. The frame 3a, the pad 3b and the skin 3c exemplify "the stay", "the cushion material" and "the skin material" in the claims respectively.

Figure 4:
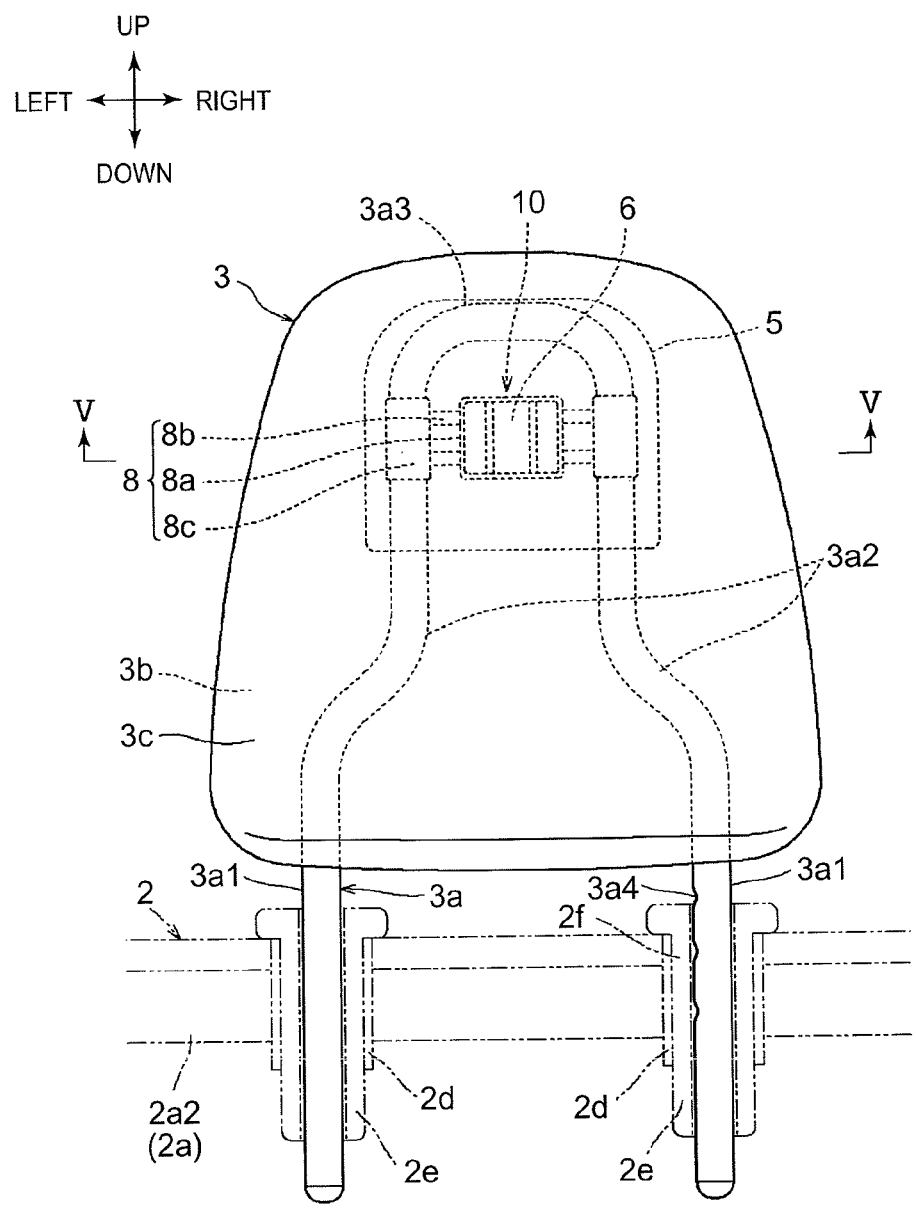
FIG. 4 is a front view of the headrest and part of a seat back according to the aforementioned embodiment of the invention.

As shown in FIGS. 1 and 4, a pair of square tube-like metal brackets 2d are attached to the upper frame 2a2. Substantially cylindrical resin support members 2e are fixed to the brackets 2d through insertion respectively. One of the support members 2e is provided with a stopper 2f for adjusting the height of the headrest 3 with respect to the seat back 2.

Figure 3:
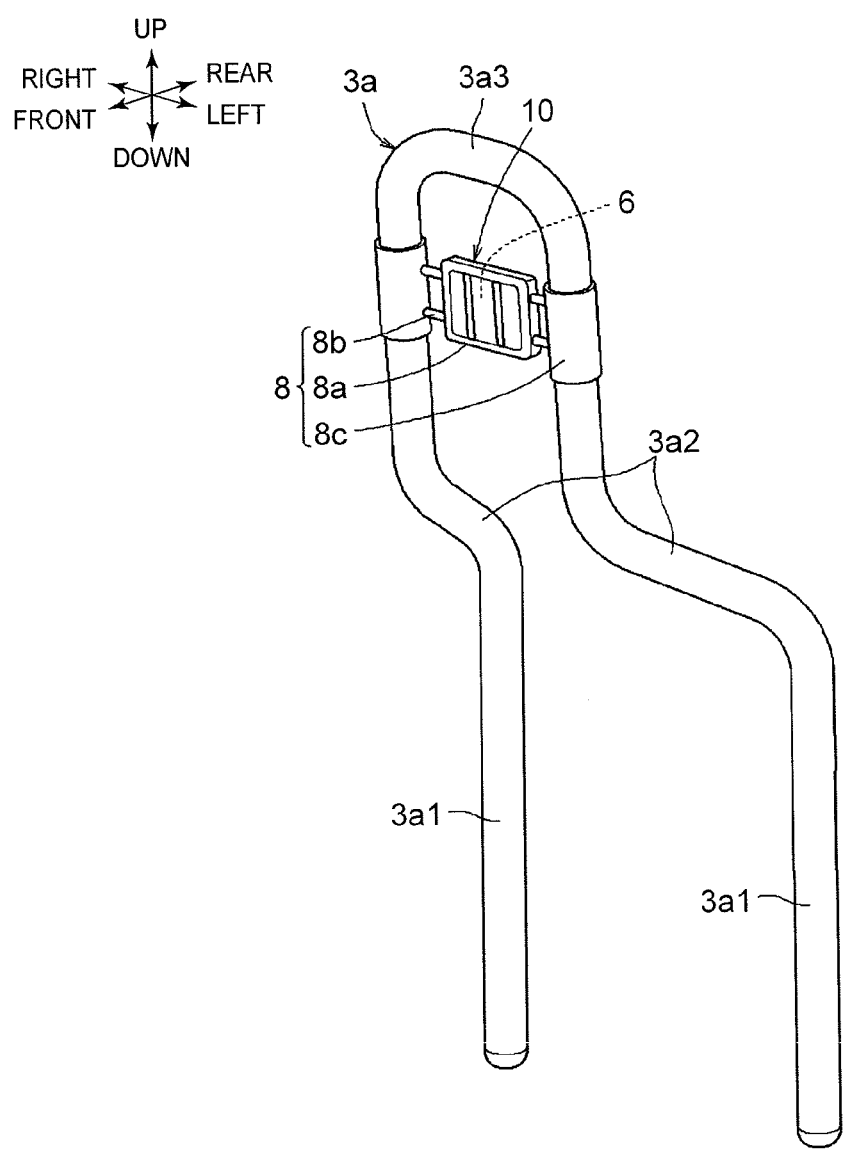
FIG. 3 is a perspective view showing a state where a dynamic damper is attached to a stay of the headrest according to the aforementioned embodiment of the invention.

As shown in FIGS. 3 and 4, the frame 3a of the headrest 3 is formed from a pipe material with a circular cross-section. The frame 3a is integrally equipped with a pair of support portions 3a1, a pair of longitudinal portions 3a2 that extend upward from the support portions 3a1 respectively, and a coupling portion 3a3 that couples upper portions of the pair of the longitudinal portions 3a2 to each other. The support portions 3a1 are inserted into the support members 2e respectively. A plurality of grooves 3a4 are formed in one of the support portions 3a1. The support members 3a1 are positioned with respect to the support members 2e by the grooves 3a4 and a stopper 2f. Thus, the height of the headrest 3 with respect to the seat back 2 can be adjusted.

Figure 2:
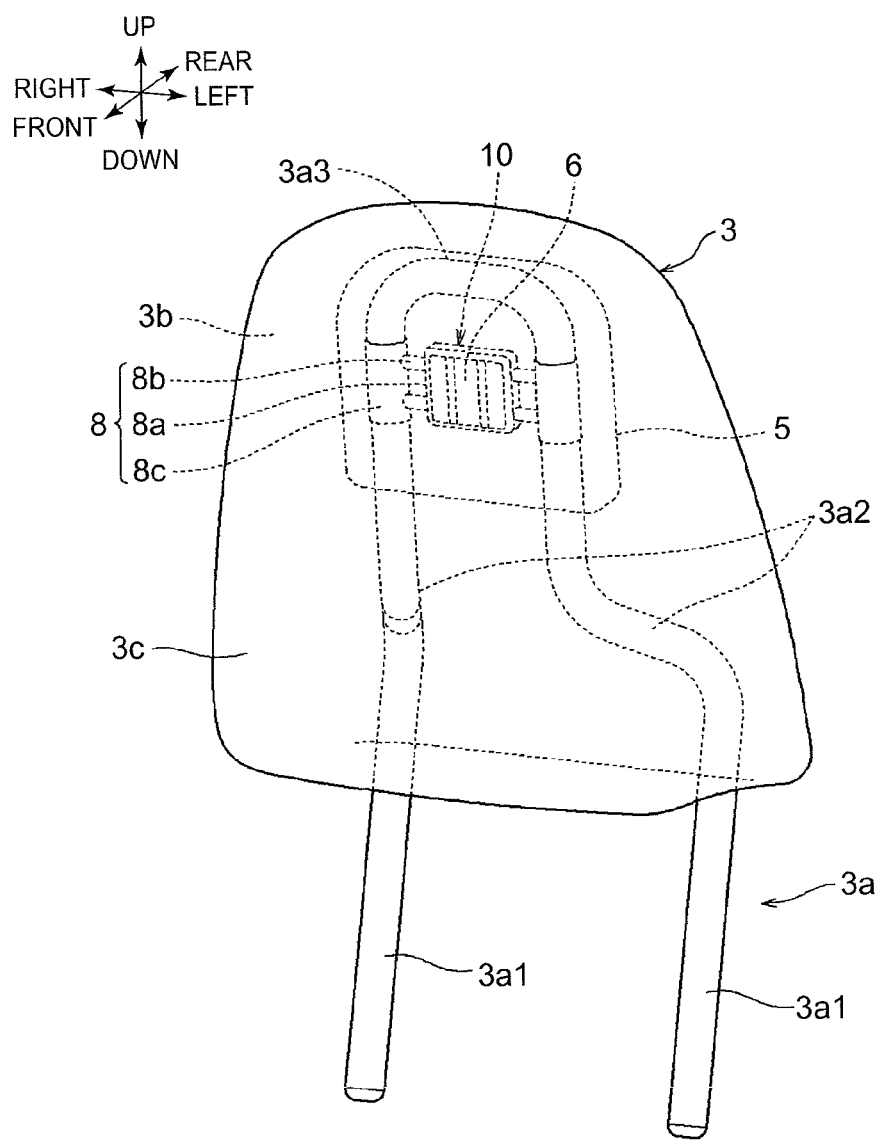
FIG. 2 is a perspective view of the headrest according to the aforementioned embodiment of the invention.

As shown in FIGS. 2 and 4, the longitudinal portions 3a2 of the frame 3a extend upward, forward and toward a width center direction in the headrest 3 from the support portions 3a1 respectively. The width gap between the upper portions of the pair of the longitudinal portions 3a2 is narrower than the width gap between lower portions thereof. A weight 6 is attached, via an elastic body 8, to a region surrounded by the upper portions of the pair of the longitudinal portions 3a2 and the coupling portion 3a3. The weight 6 and the elastic body 8 constitute a dynamic damper 10.

Figure 5:
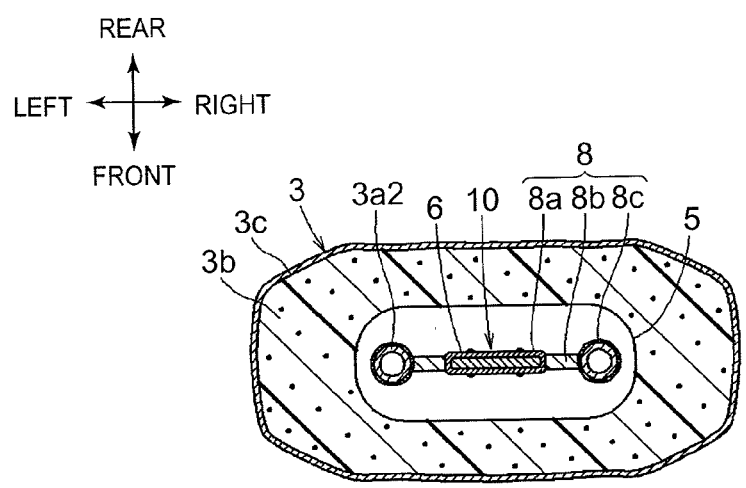
FIG. 5 is a cross-sectional view taken along an arrowed line V-V in FIG. 4.

As shown in FIGS. 3 to 5, the weight 6 is solid and made of a metal such as a steel material or the like. The weight 6 is substantially in the shape of a rectangular parallelepiped, and is surrounded by the elastic body 8 along the periphery thereof. Part of the elastic body 8 is secured and attached to the longitudinal portions 3a2 as the upper portions of the frame 3a. The weight 6 is located at an upper portion of the headrest 3 to locate the center of gravity of the headrest 3 far from the brackets 2d. Thus, when the seat back 2 vibrates, the headrest 3 can easily vibrate with respect to the seat back 2 due to an inertial force. Incidentally, the weight 6 is not limited to a substantially rectangular parallelepiped shape, but can assume a wide variety of shapes such as a circular disc shape, polygonal columnar shape, a spherical shape and the like.

The elastic body 8 is a member made of styrene butadiene rubber or ethylene propylene rubber. The weight 6 and the longitudinal portions 3a2 of the frame 3a are set in a rubber molding die, and are integrated in the die through cure adhesion. As shown in FIGS. 2 to 5, the elastic body 8 has a weight covering portion 8a that covers the weight 6, stay covering portions 8c that partially cover the pair of the longitudinal portions 3a2 respectively, and coupling portions 8b that couple the weight covering portion 8a to the stay covering portions 8c respectively. The coupling portions 8b are configured as two upper and lower cylindrical members that laterally extend parallel to the coupling portion 3a3 of the frame 3a, so as to arrange the weight 6 in the vicinity of a central portion between the longitudinal portions 3a2 and couple the weight covering portion 8a to the stay covering portions 8c respectively. Incidentally, these cylindrical members may be replaced with a single cylindrical member or three or more cylindrical members, and may not be parallel to each other.

Figure 6:
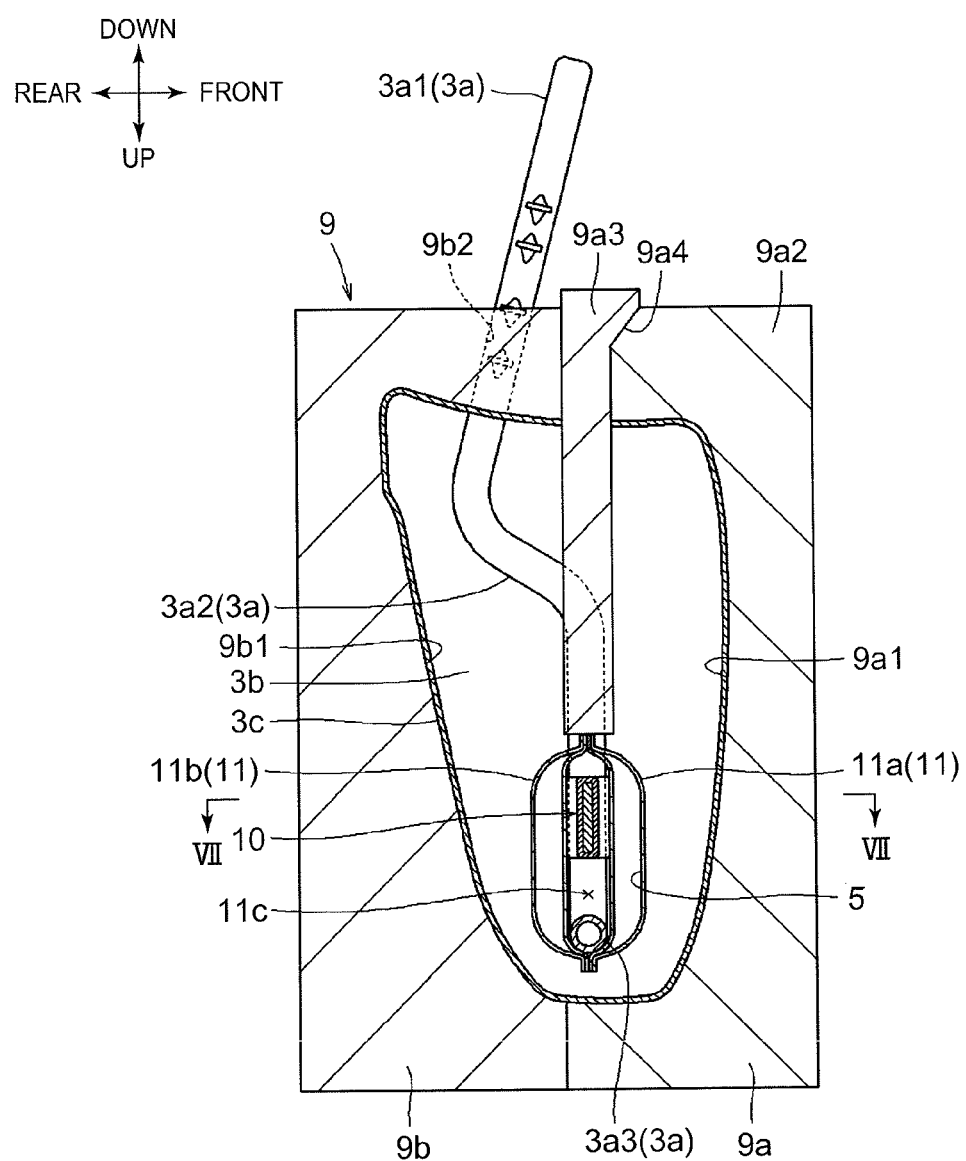
FIG. 6 is a view illustrating a method of manufacturing the headrest according to the aforementioned embodiment of the invention.

As shown in FIG. 6, the pad 3b is formed by molding foamable urethane resin. In concrete terms, the pad 3b is obtained by supplying a liquid formable urethane resin raw material into the die and curing it through foam formation in a heated state. A hollow portion 5 is formed inside the pad 3b. The hollow portion 5 is provided at such a position as to encapsulate the dynamic damper 10 and the longitudinal portions 3a2 of the frame 3a to which the dynamic damper 10 is attached. Thus, the weight 6 and the elastic body 8 can freely vibrate without abutting on the pad 3b. A method of forming the hollow portion 5 will be described later. An outer surface of the pad 3b is covered with the skin 3c. In molding the pad 3b, the skin 3c is set in the die to be integrally molded. It should be noted herein that foamable urethane resin exemplifies "foamable synthetic resin" in the claims.

A method of manufacturing the headrest 3 will be described based on FIGS. 3, 6 and 7. First of all, the dynamic damper 10 is attached to the frame 3a. In concrete terms, the weight 6 and the frame 3a are set in the rubber molding die, and a styrene butadiene rubber raw material is supplied thereto to be cured through vulcanization and integrally glued to the weight 6 and the frame 3a. Subsequently, an air bag is attached in such a manner as to longitudinally cover the longitudinal portions 3a2 of the frame 3a to which the dynamic damper 10 is integrally glued. Specifically, two air bags 11 made of polyethylene film are prepared, and a predetermined amount of air is put thereinto. After that, the dynamic damper 10 is sandwiched together with certain parts of the longitudinal portions 3a2 of the frame 3a, and the periphery thereof is stuck by a double-faced adhesive tape or the like. Heat seal or the like may also be utilized instead of the sticking by the double-faced adhesive tape. Thus, the dynamic damper 10 is arranged in a space 11c that is sandwiched by a front air bag 11a and a rear air bag 11b at the longitudinal portions 3a2 of the frame 3a, and assumes a state of being sealed by the front air bag 11a and the rear air bag 11b. It should be noted herein that the melting point of the polyethylene film constituting the air bags 11 is about 95° C., which is higher than a temperature of 70 to 80° C. at which foams are formed in molding foamable urethane resin.

Figure 7:
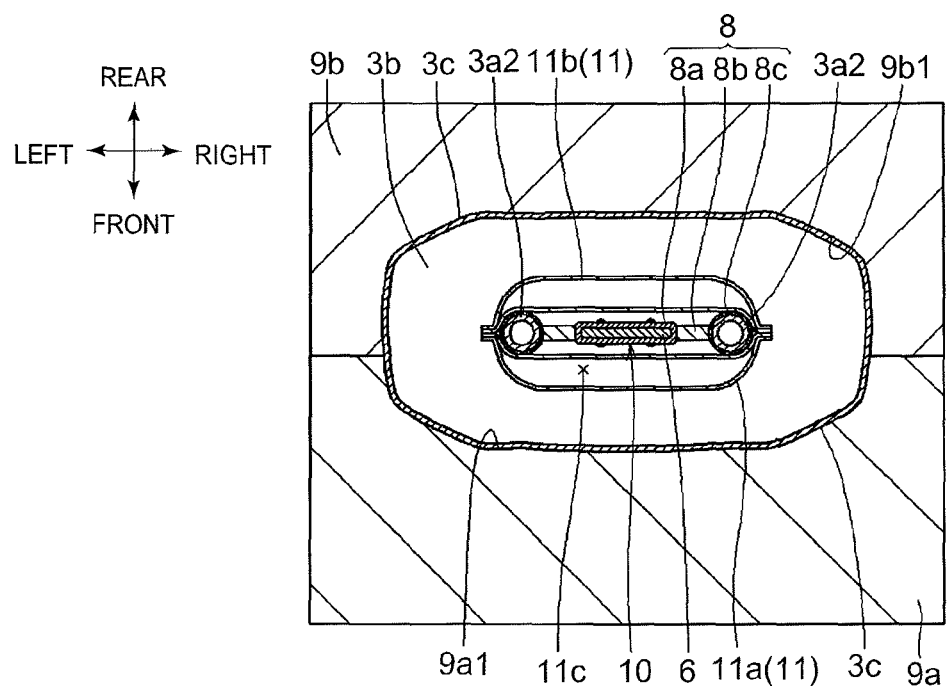
FIG. 7 is a cross-sectional view taken along an arrowed line VII-VII in FIG. 6.

As shown in FIGS. 6 and 7, a molding die 9 is configured to be divided into two molding dies, and is equipped with a first molding die 9a and a second molding die 9b. The first molding die 9a has a front cavity face 9a1 corresponding to an outer shape of a front half of the headrest 3, and the second molding die 9b has a rear cavity face 9b1 corresponding to an outer shape of a rear half of the headrest 3. When the first molding die 9a and the second molding die 9b are united with each other with the front cavity face 9a1 and the rear cavity face 9b1 opposed to each other, the front cavity face 9a1 and the rear cavity face 9b1 are integrated with each other to form a cavity corresponding in shape to the outer shape of the headrest 3. The first molding die 9a is equipped with a main body portion 9a2, and a bushing portion 9a3 that can be detached from the main body portion 9a2. The bushing portion 9a3 is a substantially rectangular plate-like member. The bushing portion 9a3 has a width slightly smaller than a dimension between the longitudinal portions 3a2 of the frame 3a, a length about half of a vertical length of the main body portion 9a2, and a thickness slightly larger than a diameter of the frame 3a. The bushing portion 9a3 is provided with a tapered portion 9a4 at a lower end portion thereof (at an end portion thereof in an outward direction of the die), and is configured not to fall into the cavity when attached to the main body portion 9a2. Two through-holes 9b2 having a diameter slightly larger than the diameter of the flame 3a are provided through a lower side of the second molding die 9b diagonally downward from the rear cavity face 9b1. The through-holes 9b2 are designed to retain the frame 3a with respect to the molding die 9 at the time of integral foam molding of foamable urethane resin.

As shown in FIG. 6, the frame 3a to which the front air bag 11a and the rear air bag 11b are attached at a location for attachment of the dynamic damper 10 is set in the cavity of the molding die 9, in a state of being covered with the skin 3c formed in the shape of a bag. At this time, it is desirable to apply a mold release agent to the surfaces of the front air bag 11a and the rear air bag 11b in advance. This is because of the purpose of making it easy to take out the air bags after completion of foam molding. Subsequently, with the skin 3c abutting on the cavity faces, the frame 3a is positioned at predetermined positions in the through-holes 9b2, and is fixed by a fixation device (not shown). In this state, the bushing portion 9a3 is not set in the first molding die 9a yet. An opening portion is provided through the skin 3c at a position corresponding to the bushing portion 9a3, so that a foamable urethane resin raw material can be injected into the skin 3c. Subsequently, the foamable urethane resin raw material is injected from this opening portion, and the bushing portion 9a3 is set. At this time, an upper end portion of the bushing portion 9a3 is arranged at such a position as to slightly abut on the air bags 11 between the longitudinal portions 3a2 of the frame 3a. In this state, the foamable urethane resin raw material reacts to be solidified, and is demolded after being retained until the pad 3b is molded. After that, the air bags 11 are destroyed through a void portion formed by the bushing portion 9a3, and are taken out of the headrest 3. Thus, the hollow portion 5 is formed around the dynamic damper 10. Incidentally, it is also appropriate to destroy the air bags 11 and only remove air therefrom without taking the air bags 11 out of the headrest 3, during or after foam molding.

The embodiment of the invention configured as described above exerts the following operation and effect. The dynamic damper 10 is arranged in the hollow portion 5 formed in the pad 3b, and does not abut on the pad 3b when vibrating. Thus, the dynamic damper 10 can sufficiently vibrate, and can efficiently suppress vibrations of the seat back 2. At this time, the air bags 11 are employed in forming the hollow portion 5, and are taken out of the headrest 3 after completion of the molding of the pad 3b. Thus, there is no need to employ a part such as an inner cover or the like, and an increase in weight resulting from an increase in the number of parts can be suppressed. Besides, as for the dynamic damper 10, the weight 6 is directly attached to the frame 3a via the elastic body 8. Therefore, vibrations of the weight 6 are likely to be transmitted to the frame 3a, and vibrations of the seat back 2 can be more efficiently suppressed. In the case where the air bags 11 are only destroyed without being taken out of the headrest 3, the process of manufacturing can be further simplified. The air bags 11 are lighter and cheaper than a part such as an inner cover or the like, so an increase in weight and an increase in cost can also be suppressed to the minimum.

Figure 8:
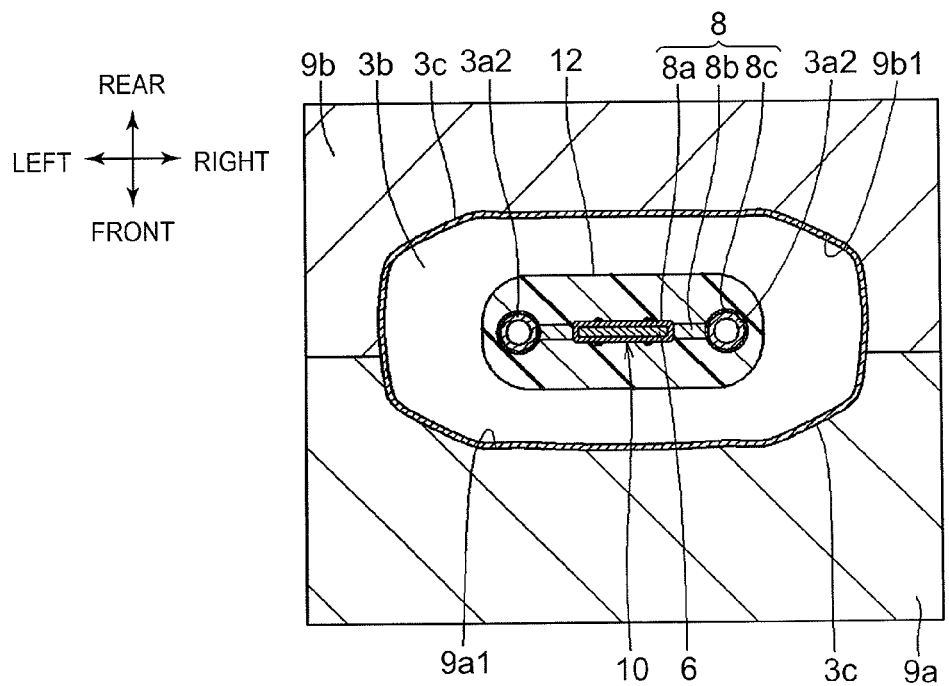
FIG. 8 is a cross-sectional view corresponding to FIG. 7, according to another embodiment of the invention.

FIG. 8 shows another embodiment of the invention. Components identical to those of the aforementioned embodiment of the invention are denoted by the same reference symbols respectively in the drawing, and the description thereof will be omitted. The difference from the aforementioned embodiment of the invention consists in that a low-melting-point material such as ice, wax, low-melting-point resin or the like is employed instead of the air bags 11. The longitudinal portions 3a2 of the frame 3a to which the dynamic damper 10 is integrally glued are longitudinally covered with wax having a melting point of about 60° C. Specifically, the interior of a die having a cavity corresponding in shape to the shape of an inner wall of the hollow portion 5 is filled with wax. The wax is solidified while the longitudinal portions 3a2 of the frame 3a to which the dynamic damper 10 is integrally glued are inserted in the molten resin. The shape of a surface of a solidified wax mass 12 is substantially identical to the outer shape of the air bags 11 that are attached to the frame 3a in the aforementioned embodiment of the invention. The frame 3a to which the wax mass 12 is attached at the location for attachment of the dynamic damper 10 is set in the cavity of the molding die 9, in a state of being covered with the skin 3c formed in the shape of a bag. Subsequently, with the skin 3c abutting on the cavity faces, the frame 3a is positioned at predetermined positions in the through-holes 9b2, and is fixed by a fixture device (not shown). In this state, the bushing portion 9a3 is not set in the first molding die 9a yet. Subsequently, the foamable urethane resin raw material is injected from this opening portion, and the bushing portion 9a3 is set. At this time, the upper end portion of the bushing portion 9a3 is arranged at such a position as to slightly abut on the wax mass 12 between the longitudinal portions 3a2 of the frame 3a. In this state, the foamable urethane resin raw material reacts to be solidified, and is demolded after being retained until the pad 3b is molded. After that, the molten wax is taken out of the headrest 3 through the void portion formed by the bushing portion 9a3. Thus, the hollow portion 5 is formed around the dynamic damper 10. It should be noted herein that wax exemplifies "the low-melting-point material" in the claims. Water in a frozen state or low-melting-point resin having a melting point lower than a temperature of 70 to 80° C. at which foams of urethane are formed may be employed instead of wax, as the low-melting-point material. Furthermore, the low-melting-point material is not absolutely required to be taken out of the headrest 3 after completion of the molding of the pad 3b. The low-melting-point material may not be taken out if the hollow portion 5 is formed through penetration of the low-melting-point material into the pad 3b.

In the aforementioned other embodiment of the invention, the hollow portion 5 for disposing the dynamic damper 10 in the pad 3b is formed by the wax mass 12 that is attached to the frame 3a at the location for attachment of the dynamic damper 10. Thus, there is no need to employ a part such as an inner cover or the like, and the head rest that is designed to suppress an increase in weight resulting from an increase in the number of parts can be manufactured. Besides, the productivity is enhanced in the case where the wax resulting from the meltdown of the wax mass 12 is not taken out after completion of the molding of the pad 3b.

Although the specific embodiments of the invention have been described hereinabove, the invention is not limited to the appearances and configurations of those specific embodiments thereof, but can be subjected to various alterations, additions and deletions within such a range as not to change the gist of the invention. For example, the following can be mentioned.

In each of the aforementioned embodiments of the invention, two air bags, namely, the front air bag 11a and the rear air bag 11b are employed as the air bags 11, but the invention is not limited thereto. A single air bag may be employed in a bent state.

In each of the aforementioned embodiments of the invention, a rubber material such as styrene-butadiene rubber, ethylene-propylene rubber or the like is applied as the material of the elastic body 8, but the invention is not limited thereto. A thermoplastic resin exhibiting adhesiveness, such as modified polypropylene resin or the like can also be employed. Besides, integral molding of the frame 3a and the elastic body 8 is not indispensable. The elastic body 8 may be mechanically attached to the frame 3a.

In each of the aforementioned embodiments of the invention, the invention is applied to the automobile seat, but is not limited thereto. The invention can also be applied to a railroad vehicle seat, an aircraft seat, a ship seat and the like.

What is claimed is:
1. A headrest comprising:
   a stay;
   a skin material;
   a cushion material that is foam-molded integrally with the stay inside the skin material and that has a hollow portion therein; and
   a dynamic damper that is attached to the stay and that is disposed in the hollow portion in such a manner as not abut on the cushion material, wherein
   the dynamic damper includes:
      a weight; and
      an elastic body that is integrally attached to the weight, wherein
   the elastic body includes:
      a weight covering portion that covers the weight;
      a stay covering portion that covers at least a portion of the stay; and
      a coupling portion that couples the weight covering portion to the stay covering portion, and
   the elastic body is rubber.
2. The headrest according to claim 1, wherein the elastic body is directly attached to the stay.
3. The headrest according to claim 1, wherein the dynamic damper is disposed in the hollow portion so as to be spaced from the cushion material in such a manner that the dynamic damper does not abut on the cushion material.

* * * * *